Figure 1:
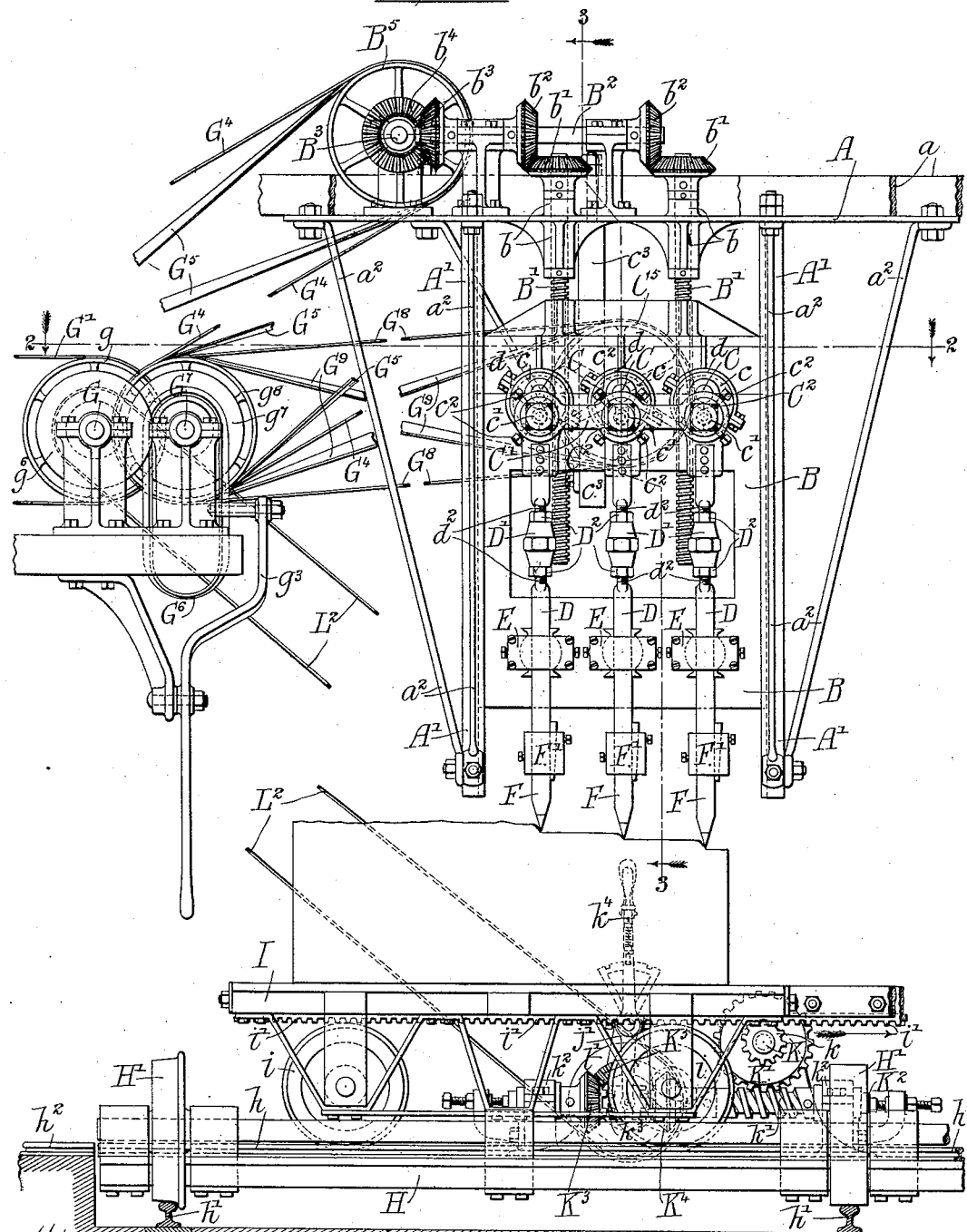

(No Model.) 3 Sheets—Sheet 1.

J. RAWLE.
STONE CUTTING AND DRESSING MACHINE.

No. 482,098. Patented Sept. 6, 1892.

Witnesses: Louis M. F. Whitehead, Irvine Miller

By Dayton Pooler Brown his Attorneys

Inventor: John Rawle.

THE NORRIS PETERS CO., PHOTO-LITHO., WASHINGTON, D. C.

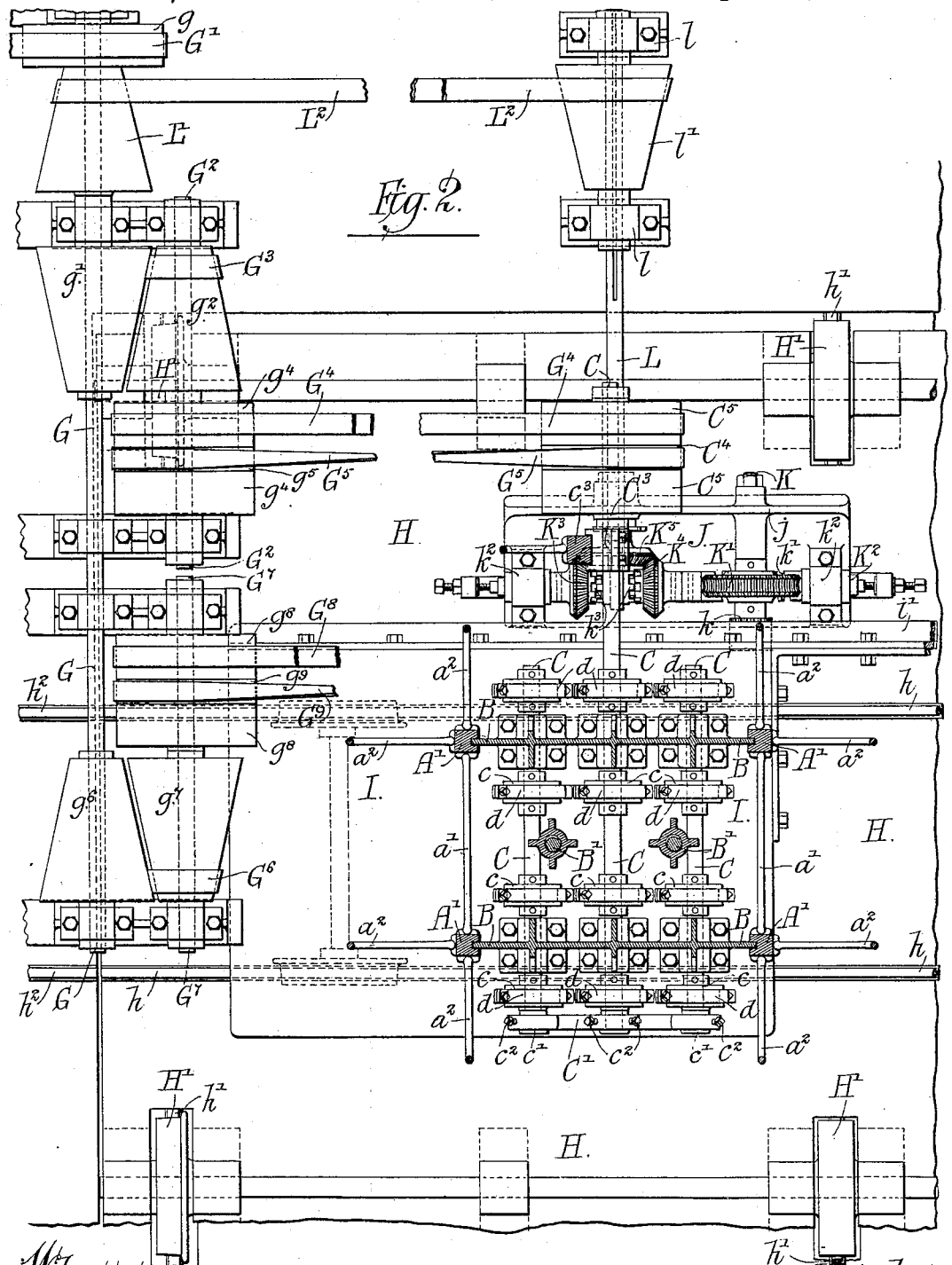

(No Model.) 3 Sheets—Sheet 3.
J. RAWLE.
STONE CUTTING AND DRESSING MACHINE.
No. 482,098. Patented Sept. 6, 1892.
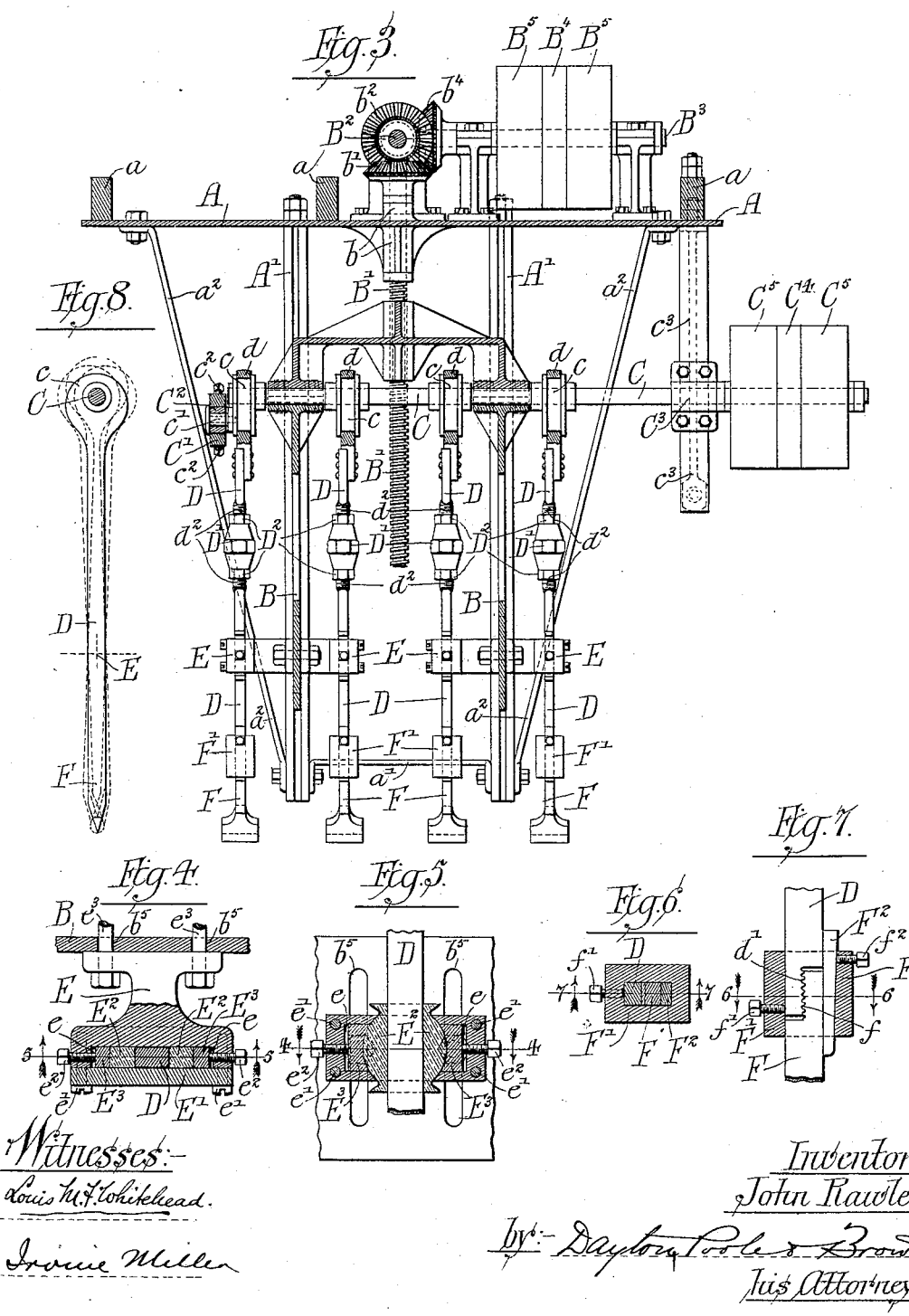

UNITED STATES PATENT OFFICE.

JOHN RAWLE, OF CHICAGO, ILLINOIS.

STONE CUTTING AND DRESSING MACHINE.

SPECIFICATION forming part of Letters Patent No. 482,098, dated September 6, 1892.

Application filed April 7, 1891. Serial No. 387,968. (No model.)

*To all whom it may concern:*

Be it known that I, JOHN RAWLE, of Chicago, in the county of Cook and State of Illinois, have invented certain new and useful Improvements in Stone Cutting and Dressing Machines; and I do hereby declare that the following is a full, clear, and exact description thereof, reference being had to the accompanying drawings, and to the letters of reference marked thereon, which form a part of this specification.

This invention relates to machines for cutting, dressing, chiseling, and splitting stone, and has for its object to provide a machine wherein the work is done by cutting tools or chisels and in which each cutting tool or chisel, although actuated solely by mechanical means, will have a motion or action in cutting which resembles that given by the workman to the ordinary hand-chisel in stone-dressing, whereby superior work may be easily and rapidly produced.

My invention has for a further object certain improvements in the arrangement of the cutting tools or chisels and driving mechanism for the same and in the construction and operation of the work-holding carriage which carries the stone and feeds it to the chisels.

To these and other ends my invention consists in certain novel features, which will be hereinafter set forth, and specifically pointed out in the appended claims.

In the accompanying drawings, Figure 1 is a side elevation of a machine embodying one form of my invention, an intermediate portion of the driving mechanism being broken away and the remainder brought near the body of the machine. Fig. 2 is a plan section taken on the line 2 2 of Fig. 1 and looking in the direction of the arrows. Fig. 3 is a vertical section of the upper portion of the machine, taken on the line 3 3 of Fig. 1 and looking in the direction of the arrows. Fig. 4 is an enlarged detail plan section of the oscillating bearing of one of the chisel-bars, taken on the line 4 4 of Fig. 5 and looking in the direction of the arrows. Fig. 5 is an enlarged vertical sectional view of the same, taken on the line 5 5 of Fig. 4 and looking in the direction of the arrows. Fig. 6 is an enlarged plan section of the coupling connecting the chisel and chisel-bar, taken on the line 6 6 of Fig. 7 and looking in the direction of the arrows. Fig. 7 is a vertical sectional view of the same, taken on the line 7 7 of Fig. 6 and looking in the direction of the arrows. Fig. 8 is a diagram illustrating the movement of the chisel-bar and chisel when in operation.

A represents a suitable base-plate attached to overhead rafters or girders $a$, or supported at the desired height in any suitable manner. Suspended from this base-plate are guide-bars A', four in number, shown in the present instance as bolted to the base-plate A, their lower ends being connected by suitable strut and tie rods $a'$ and supported in position by braces $a^2$, extending to the base-plate A.

Within the guiding-frame formed by these guide-bars A' is located a vertically-movable frame B, which carries the chisel-bars and their actuating mechanism and serves to feed the same to the work and withdraw them therefrom when their operation is completed. This frame is supported and moved vertically by means of screw-shafts B', which pass through suitably-threaded apertures in the said frame and are mounted in bearings $b$ on the bed-plate A. The upper ends of these screw-shafts are each provided with a bevel-gear $b'$, with which mesh corresponding bevel-gears $b^2$ on a shaft $B^2$, mounted in suitable bearings on the base-plate A. The shaft $B^2$ has at one of its ends a bevel-gear $b^3$, which meshes with a similar gear $b^4$ on a shaft $B^3$, mounted in suitable bearings on the base-plate A and provided with fast and loose pulleys $B^4 B^5$, by means of which it is driven in the manner hereinafter set forth.

In the upper portion of the frame B are journaled a plurality of parallel shafts C. (Shown in the present instance as three in number, although this number may obviously be varied, as desired.) Upon each of these shafts there is mounted a plurality of eccentrics $c$ for actuating the chisel-bars, and the several shafts are connected by driving devices, giving to all of them the same speed. In the connection which I have shown for this purpose the outer eccentrics at one end of the shafts C are provided with pins $c'$, which are connected by a rod or bar C', provided with bearing-blocks $C^2$, held in place by set-screws $c^2$ and embracing the pins $c'$. One of the shafts C, preferably the central one, is extended through a bearing $C^3$, mounted to slide vertically on a guiding and supporting bar $c^3$, extending downward from the base-plate A.

On the extended shaft C are mounted fast and loose pulleys $C^4$ $C^5$, by means of which the shafts C are driven in the manner hereinafter set forth.

The chisel-bars D are connected with the eccentrics $c$, each bar being provided at its upper end with a strap $d$, which embraces the corresponding eccentric $c$, the said straps being divided, as shown, to facilitate assembling and disconnecting the parts. Each chisel-bar is also provided near its lower end with a suitable bearing E on the frame B, which will permit a vertical and oscillatory motion of the said bar.

As shown in the present instance, and more particularly in Figs. 4 and 5, each bearing consists of a box attached to the frame B and having a recess $e$, closed by a plate or cap $E'$, secured by screw-bolts $e'$. Within this recess, on opposite sides of the bar D, are located bearing-blocks $E^2$, having surfaces adjacent to the said bar adapted to fit the same, while their outer surfaces are curved, forming arcs of a circle having the center of the bar D as a center. Gibs $E^3$ bear against the blocks $E^2$ to hold them in place and have their bearing-surfaces curved to correspond with the curvature of said blocks. Adjusting-screws $e^2$ pass through the ends of the box and bear against the gibs $E^3$, serving to hold these latter in position and also to adjust them to take up any wear which may occur. At its lower end each chisel-bar D is rabbeted, as shown at $d'$, said rabbet having preferably a slightly-inclined surface, as shown, and being provided with serrations or corrugations.

F represents the chisel, the upper end of which is similarly rabbeted and serrated, as shown at $f$, and which fits upon the rabbeted end of the chisel-bar D, as shown more particularly in Figs. 6 and 7.

$F'$ represents a collar adapted to inclose the meeting ends of the chisel-bar and chisel when adjusted, the aperture of said collar being somewhat wider than the combined width of these parts and having one of its walls inclined, as shown in Fig. 7, to receive a wedge $F^2$, which serves in an obvious manner to take up all looseness or wear and hold the parts firmly in position. A set-screw $f'$ bears against the chisel-bar to more firmly unite the parts, and another set-screw $f^2$ bears against the wedge $F^2$ to hold the same in place and prevent its working loose.

Each chisel-bar is made in two parts, adjustable longitudinally relatively to each other, so that each bar may be independently lengthened or shortened, as desired. One form of connection adapted for obtaining this result I have shown in the drawings, in which the meeting ends of the two parts of the chisel-bar are rounded and threaded externally, as shown at $d^2$, the said ends being connected by a right-and-left nut or turnbuckle $D'$, by means of which the said parts may be drawn toward each other or separated in an obvious manner. Lock-nuts $D^2$ serve to hold the parts firmly in place after adjustment.

G represents a shaft arranged parallel with the shaft C and $B^3$ and provided with a pulley $g$, by means of which it may be driven from any suitable source by a belt $G'$. Upon the shaft G is mounted a conical pulley $g'$, and upon a counter-shaft $G^2$ is mounted a similar but reversely arranged conical pulley $g^2$. Between the parallel faces of these pulleys is arranged a belt $G^3$, which passes over one of said pulleys and is compressed between the two pulleys with sufficient force to transmit motion from one pulley to the other. It is obvious that the rate of speed of the shaft $G^2$ may be varied as desired by shifting the belt $G^3$ longitudinally between the two conical pulleys, the position shown being that in which the speed of the shaft $G^2$ is the highest attainable. A belt-shifter $g^3$ may be employed to shift and hold the belt $G^3$.

Upon the shaft $G^2$ are located fast pulleys $g^4$ and $g^5$, around which pass a straight belt $G^4$ and a cross-belt $G^5$, respectively. These belts pass over the loose pulleys $C^5$ on the shaft C, and either of them may be shifted upon the fast pulley $C^4$ on said shaft, whereby the said shaft, and consequently the chisel-bars, may be driven in either direction at any desired rate of speed. At the other end of the shaft G there is a similar conical pulley $g^6$, driving a corresponding pulley $g^7$ on a counter-shaft $G^7$ by means of an interposed belt $G^6$. The counter-shaft $G^7$ is provided with fast pulleys $g^8$ and $g^9$, over which pass a straight belt $G^8$ and a cross-belt $G^9$, respectively, these belts also passing over the loose pulleys $B^5$ on the shaft $B^3$. By shifting either of the said belts upon the fast pulley $B^4$ the shaft $B^3$, and consequently the feed-screws $B'$, may be rotated in either direction, so as to move the frame B and the chisel-bars either downward or upward, as desired, and the rate of speed may be adjusted by means of the belt $G^6$ in an obvious manner.

The stone to be operated upon may be supported and fed in any desired way; but I prefer for this purpose to employ the construction which is shown in the drawings. In this construction H represents a secondary carriage adapted to move laterally of the machine and provided for this purpose with wheels $H'$, adapted to travel on rails $h'$. These rails are arranged in a pit or depression, whereby the top of the said carriage, which is provided with rails $h$ for the main carriage I, is on a level with the ground, upon which rails $h^2$ are laid to form a track, of which the rails $h$ are a continuation when the secondary carriage is in working position. By this construction the main carriage I, which is provided with wheels $i$ for the purpose, may be loaded at a distant part of the yard and then drawn into position on the secondary carriage.

Upon the secondary carriage H is mounted a bed-plate J, provided with an upright $j$, which forms a bearing for a shaft K, provided with a pinion $k$, which meshes with a rack $i'$ on the carriage I. There is also mounted on the shaft K a worm-wheel K', which meshes with a worm $k'$ on a shaft $K^2$, mounted in suitable bearings $k^2$ on the bed-plate J.

On the shaft $K^2$ are mounted loosely two bevel-gears $K^3$ and $K^4$, and between these gears there is splined on said shaft a clutch $k^3$, which may be caused to engage with either of said bevel-gears or may be held in a central position between the same out of engagement with both, as desired. This clutch is operated by means of a lever $k^4$, mounted on a standard $j'$, rising from the bed-plate, said lever being provided with the usual notched segment and spring locking-bolt, by means of which it may be locked in either one of its three positions. Both of the bevel-gears $K^3$ and $K^4$ mesh with a bevel-gear $K^5$, having its hub mounted in a suitable bearing in the standard $j'$, said bevel-gear $K^5$ being secured on a shaft L, mounted to slide in suitable fixed bearings $l$, between which there is splined on said shaft a cone-pulley $l'$, by means of which said shaft is driven from a corresponding cone-pulley L' on the shaft G through the medium of a belt $L^2$. By this means the speed at which the carriage is fed may be varied as desired to suit the character of the stone to be operated upon.

The machine thus organized operates when employed for dressing stone in the following manner: The stone to be dressed is placed upon the carriage at any suitable point, the track $h^3$ connecting with the ordinary system of yard-tracks commonly used in stone-yards for this purpose. The carriage H is then pushed into position to receive the carriage I, the pit or depression in which the carriage H is arranged being of a sufficient depth to bring the top of the carriage H level with the yard-surface upon which the track $h^2$ is laid. The carriage I is then pushed onto the carriage H and is free to move on the rails $h$ thereof, its rack $i'$ engaging with the pinion $k$. The carriage H may, if necessary, be moved laterally of the machine, in order to bring the stone M into proper position under the chisels. The frame B is then lowered by means of the feeding mechanism described until the chisels are in the proper position relatively to the stone, when motion is imparted to the chisels in the desired direction and at the desired rate of speed through the medium of the actuating mechanism described in the manner set forth, while at the same time the carriage I is fed forward at the desired rate of speed by means of the pinion K, the clutch $k^3$ being engaged with the bevel-gear $K^4$ for this purpose to actuate the worm $k'$ in the proper direction. The motion imparted to the chisels by the eccentric and oscillating bearing employed to actuate and guide them is, as shown in the dotted lines in the diagram Fig. 8, a close approximation to the movement imparted to the chisel by hand in the ordinary operation of hand dressing or chipping. In other words, instead of a rectilinear reciprocation delivery a direct blow and withdrawing in the same path, there is a circular or curved cut closely imitating the combined downward and lateral blow given by the stone-mason in hand-dressing. The amount of lateral movement given to the chisel depends upon the distance between the actuating-eccentric and the bearing E, and this latter may be vertically adjusted on the frame B for the purpose of regulating the extent of this lateral motion. This vertical adjustment may be effected in any desired manner—as, for instance, in the manner shown, in which construction the frame B is provided with vertical slots $b^5$ to receive the bolts $e^3$, which secure the bearings E, it being obvious that said bolts may be so adjusted in said slots as to give the bearings the desired height. By employing a plurality of cutters arranged in a row transversely of the machine a stone of considerable width may be dressed at a single operation, although it is obvious that a lateral shifting of the carriage will enable me to operate on a stone of any desired width by bringing different portions of its surface successively under the chisels.

By employing a plurality of chisels arranged in a longitudinal row to operate successively upon the stone the first cutter may be caused to do the first rough work and the following cutters to advance the operation of dressing until after the stone has been acted upon by all of the cutters the operation of dressing is completed. For this purpose I prefer to so arrange the chisels that each row will cut somewhat deeper than the preceding one, and this I accomplish either by employing chisels of varying lengths by adjusting the chisels at their point of connection with the chisel-bars by means of the construction there provided for that purpose and already described or by lengthening or shortening the adjustable chisel-bars. The eccentrics are shown in the present instance as so arranged as to cause the chisels to strike simultaneously; but it is obvious that this arrangement may be so varied as to cause the chisels to strike successively, if desired. The number and arrangement of the chisels may also be varied as desired.

When the carriage I has fed the stone forward once under the chisels, it may be returned by moving the clutch $k^3$ into engagement with the bevel-gear $K^3$, when the direction of movement of the pinion $k$ will be reversed and the carriage I moved back to its original position. If desired, the direction of movement of the chisels may be reversed during this return of the carriage and the chisels caused to operate on the stone during this return movement. In either case the chisels may be caused to cut either with or against the feed of the stone, as desired.

It may sometimes be necessary or desirable to feed the frame B up or down during the period of operation of the chisels, and this may be accomplished in either direction at any desired rate, whether the chisels are or are not in operation.

In the operation of hand-chiseling certain kinds of stone, as sandstone, the operator, after having given a few strokes of the chisel with one side of the cutting-edge thereof upward, reverses the tool and gives about an equal number of strokes with the other side uppermost, continuing to thus reverse the tool, so as to alternately present the opposite sides of the cutting-edge of the tool to the stone. The result is that the chisel practically sharpens itself through the medium of this reversal, which is necessary for the practical success of the operation, as the chisel would otherwise become dull so quickly as to soon render it useless. By reversing the direction of movement of the chisels, as hereinbefore set forth, I am enabled to accomplish the same result—that is to say, present the opposite sides of the cutting-edge of the chisel alternately to the stone without stopping the operation of the machine for an appreciable interval, as the reversal is practically instantaneous.

It is obvious that instead of an eccentric for actuating the chisel-bar a crank may be employed, the same being a well-known equivalent of the eccentric for this and similar purposes.

Although I have referred to the machine as a stone-dressing machine, its use is obviously not limited to this operation in its strict technical sense.

In addition to its use as a stone cutting and dressing machine it may be used for working stone generally, and by using chisels of suitable conformation various kinds of work may be done with it. For instance, the machine is especially adapted for channeling stone or for forming the holes by means of which stones are split by plugging, wedging, or other methods.

It will also be noted that although I have described the chisels as fixed and the stone as being fed thereto, by a mere reversal of the parts the stone may be fixed and the chisels fed over the stone without departing from the principle of my invention. Moreover, as far as the chisels and actuating devices therefor are concerned, means other than the devices described for supporting and moving the stone may be used with the same general result.

What I claim is—

1. In a stone cutting and dressing machine, a chisel-bar, in combination with an eccentric or its equivalent for actuating said chisel-bar, a stationary bearing engaging said chisel-bar, and driving-gear for the eccentric, embracing means for reversing the direction of motion of the same, substantially as described.

2. In a stone cutting and dressing machine, a chisel-bar, in combination with an eccentric or its equivalent for actuating the same, a stationary bearing engaging said chisel-bar between the actuating-eccentric and the cutting end of the bar, said bearing being adjustable toward and from the actuating-eccentric to vary the oscillation of the chisel-bar, and driving-gear for the eccentric, embracing means for reversing the direction of motion of the same, substantially as described.

3. In a stone cutting and dressing machine, the combination, with a plurality of chisel-bars of different lengths arranged in a straight row, one behind the other, and an eccentric or its equivalent for imparting to said chisels a combined reciprocatory and oscillatory motion, of stationary bearings engaging said bars between the eccentrics and the ends thereof, and driving-gear for the eccentric, embracing means for reversing the direction of motion of the same, substantially as described.

4. In a stone cutting and dressing machine, the combination, with the main chisel-actuating shaft C, having a fast pulley $C^4$ and loose pulleys $C^5$, of the straight and cross belts $G^4$ $G^5$, the counter-shaft $G^2$, having pulleys $g^4$ and $g^5$ and cone-pulley $g^2$, the shaft G, having cone-pulley $g'$, and the adjustable belt $G^3$, gripped between said cone-pulleys, substantially as described.

5. In a stone cutting and dressing machine, the combination, with chisels and actuating mechanism therefor, of a frame wherein said chisels are mounted, and power-actuated feeding mechanism for moving said frame toward and from the stone, comprising means for varying the speed of said feeding mechanism to advance the frame more or less rapidly, as desired, substantially as described.

6. In a stone cutting and dressing machine, the combination, with a chisel-carrying frame and feed-screws therefor provided with bevel-gears, of a shaft provided with bevel-gears to mesh therewith and having a bevel-gear $b^3$, a shaft $B^3$, having a bevel-gear $b^4$ and fast and loose pulleys $B^4$ $B^5$, straight and cross belts $G^8$ $G^9$, a counter-shaft $G^7$, having pulleys $g^8$ $g^9$ and cone-pulley $g^7$, a shaft G, having cone-pulley $g^6$, and an adjustable belt $G^6$, gripped between said pulleys, substantially as described.

7. In a stone cutting and dressing machine, the combination, with a frame, of a plurality of shafts mounted therein and provided with eccentrics to actuate the chisels, pins on the outer eccentrics, a connecting-rod having bearings for said pins, and actuating mechanism connected with one of said shafts to rotate the same, substantially as described.

8. In a stone cutting and dressing machine, the combination, with a chisel-bar and an eccentric or its equivalent for actuating the same, of an oscillating bearing, through which the chisel-bar passes and reciprocates, said bearing being located between the said eccentric and the working end of the bar, and driving-gear for the eccentric, embracing means for reversing the direction of motion of the same, substantially as described.

9. In a stone cutting and dressing machine, the combination, with a chisel-bar and its actuating mechanism, of a bearing-box E, having a recess $e$, bearing-blocks $E^2$, having surfaces adapted to fit the chisel-bars and having their outer faces curved, and gibs $E^3$, having correspondingly curved faces to bear against the bearing-blocks, substantially as described.

10. In a stone cutting and dressing machine, the combination, with the chisel-bar and its actuating mechanism, of a bearing-box E, having a recess $e$, bearing-blocks $E^2$, having curved outer surfaces, gibs $E^3$, having correspondingly curved abutting-surfaces, and adjusting-screws $e^2$, bearing on said gibs, substantially as described.

11. In a stone cutting and dressing machine, the combination, with a chisel-bar having a serrated rabbet $d$, of a chisel having a corresponding rabbet $f$, a collar $F'$, wedge $F^2$, and set-screws $f'$ and $f^2$, substantially as described.

12. In a stone cutting and dressing machine, the combination, with a chisel-bar and an eccentric or its equivalent for actuating said bar, of a stationary bearing engaging the bar between the eccentric and its end, a driving-gear for actuating the eccentric, comprising means for reversing the direction of motion of the same, a carriage, and reversible feed mechanism for moving said carriage in either direction, substantially as described.

In testimony that I claim the foregoing as my invention I affix my signature in presence of two witnesses.

JOHN RAWLE.

Witnesses:
IRVINE MILLER,
ALBERT H. GRAVES.